(12) United States Patent
Pankratz

(10) Patent No.: US 12,269,339 B2
(45) Date of Patent: Apr. 8, 2025

(54) HEADS UP DISPLAY

(71) Applicant: 3M INNOVATIVE PROPERTIES COMPANY, St. Paul, MN (US)

(72) Inventor: Stephan J. Pankratz, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 429 days.

(21) Appl. No.: 17/798,949

(22) PCT Filed: Feb. 5, 2021

(86) PCT No.: PCT/IB2021/050952
§ 371 (c)(1),
(2) Date: Aug. 11, 2022

(87) PCT Pub. No.: WO2021/165778
PCT Pub. Date: Aug. 26, 2021

(65) Prior Publication Data
US 2023/0081054 A1 Mar. 16, 2023

Related U.S. Application Data

(60) Provisional application No. 62/977,608, filed on Feb. 17, 2020.

(51) Int. Cl.
*B60K 35/00* (2024.01)
*B60K 35/23* (2024.01)
(Continued)

(52) U.S. Cl.
CPC .......... *B60K 35/00* (2013.01); *G02B 27/0101* (2013.01); *B60K 35/23* (2024.01);
(Continued)

(58) Field of Classification Search
CPC ... G02B 27/01–0189; G02B 2027/0105–0198; B60K 35/00–20; B60K 2360/00–96
See application file for complete search history.

(56) References Cited

U.S. PATENT DOCUMENTS

2018/0081172 A1* 3/2018 Liu .................. G02B 27/286
2019/0317325 A1* 10/2019 Malinovskaya ... G02B 27/4261

FOREIGN PATENT DOCUMENTS

| JP | 05330362 A | 12/1993 |
| JP | 2016122041 A | 7/2016 |
| JP | 2019211783 A | 12/2019 |

OTHER PUBLICATIONS

International Search Report for PCT International Application No. PCT/IB2021/050952, mailed on Apr. 27, 2021, 3 pages.

* cited by examiner

*Primary Examiner* — Bao-Luan Q Le
*Assistant Examiner* — Christopher A Lamb, II
(74) *Attorney, Agent, or Firm* — Jonathan L. Tolstedt

(57) ABSTRACT

A heads up display (HUD) includes a display source for emitting an emitted image, a windshield and an absorbing polarizer. For substantially normally incident light, the absorbing polarizer substantially transmits the incident light polarized along a pass direction, and substantially absorbs the incident light polarized along a block direction. The emitted image includes at least one image ray that is received and transmitted by the absorbing polarizer toward the windshield at a first location of the absorbing polarizer. The transmitted image ray is received and reflected by the windshield at a second location of the windshield. A first normal line of the absorbing polarizer at the first location is substantially parallel to a projection of the transmitted image ray onto the windshield. Further, the pass direction of the absorbing polarizer at the first location is substantially parallel to a second normal line of the windshield at the second location.

10 Claims, 5 Drawing Sheets

(51) Int. Cl.
   *B60K 35/28* (2024.01)
   *G02B 27/01* (2006.01)
(52) U.S. Cl.
   CPC ........ *B60K 35/28* (2024.01); *B60K 2360/164* (2024.01); *B60K 2360/169* (2024.01); *B60K 2360/175* (2024.01); *B60K 2360/177* (2024.01); *B60K 2360/178* (2024.01); *B60K 2360/23* (2024.01); *B60K 2360/33* (2024.01); *G02B 2027/0118* (2013.01)

HEADS UP DISPLAY

CROSS REFERENCE TO RELATED APPLICATIONS

This application is a national stage filing under 35 U.S.C. 371 of PCT/IB2021/050952, filed Feb. 5, 2021, which claims the benefit of U.S. Application No. 62/977,608, filed Feb. 17, 2020, the disclosures of which are incorporated by reference in their entireties herein.

TECHNICAL FIELD

The present disclosure relates generally to a display used in vehicles, and in particular, to a heads up display (HUD).

BACKGROUND

A heads up display (HUD) is used in a vehicle to present information to a vehicle occupant without requiring the occupant to look away from the vehicle surroundings that can be viewed through a vehicle windshield. The HUDs are now increasingly used as a safety feature for vehicles, such as automobiles. One main concern for HUD's adoption in vehicles is ghosting. Ghosting refers to generation of "ghost images" caused by unwanted reflections at front and back glass-air interfaces of the windshield. Ghost images typically appear as secondary images that are slightly displaced from a primary HUD image.

SUMMARY

In one aspect, the present disclosure provides a heads up display (HUD) for forming a virtual image of an emitted image for viewing by an occupant of a vehicle. The HUD includes a display source, a windshield of the vehicle, and an absorbing polarizer. The display source is configured to emit the emitted image. The absorbing polarizer is disposed between the display source and the windshield, such that for substantially normally incident light and for at least one wavelength between about 420 nm and about 670 nm, the absorbing polarizer transmits at least 60% of the incident light polarized along a pass direction, and absorbs at least 60% of the incident light polarized along an orthogonal block direction. The emitted image includes at least one image ray that is received and transmitted by the absorbing polarizer toward the windshield at a first location of the absorbing polarizer. The transmitted image ray is received and reflected by the windshield toward the occupant at a second location of the windshield, such that a first normal line of the absorbing polarizer at the first location is substantially parallel to a projection of the transmitted image ray onto the windshield, and the pass direction of the absorbing polarizer at the first location is substantially parallel to a second normal line of the windshield at the second location.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a heads up display (HUD) for forming a virtual image of an emitted image for viewing by an occupant of a vehicle. The HUD may be used in various vehicles, such as aircrafts, watercrafts, or landcrafts (including motor vehicles, such as automobiles, trucks, and motorcycles). The HUD includes an absorbing polarizer disposed between a display source configured to emit the emitted image, and a windshield of the vehicle. The absorbing polarizer substantially transmits an incident light polarized along a pass direction, and substantially absorbs the incident light polarized along an orthogonal block direction. The emitted image includes at least one image ray that is received and transmitted by the absorbing polarizer toward the windshield at a first location of the absorbing polarizer. The transmitted image ray is received and reflected by the windshield toward the occupant at a second location of the windshield. The at least one image ray and the transmitted image ray are such that a first normal line of the absorbing polarizer at the first location is substantially parallel to a projection of the transmitted image ray onto the windshield, and the pass direction of the absorbing polarizer at the first location is substantially parallel to a second normal line of the windshield at the second location.

In other words, a plane of the absorbing polarizer is orthogonal to both the windshield and the projection of the transmitted image ray onto the windshield, and the pass direction of the absorbing polarizer is orthogonal to a plane of the windshield.

The absorbing polarizer may have a curved shape and a position such that substantially all transmitted image rays of the emitted image from the display source have a single polarization state (e.g., P-polarization state). Therefore, light originating from the display source incident on the windshield may be substantially of the single polarization state at all viewing angles.

The windshield may be designed such that substantially all of incident light in the single polarization state is reflected toward the occupant. This may reduce or eliminate "ghosting". In other words, providing light of substantially the single polarization onto the windshield may prevent generation of "ghost images" that are otherwise caused by unwanted reflections at front and back glass-air interfaces of the windshield.

Figure 1:
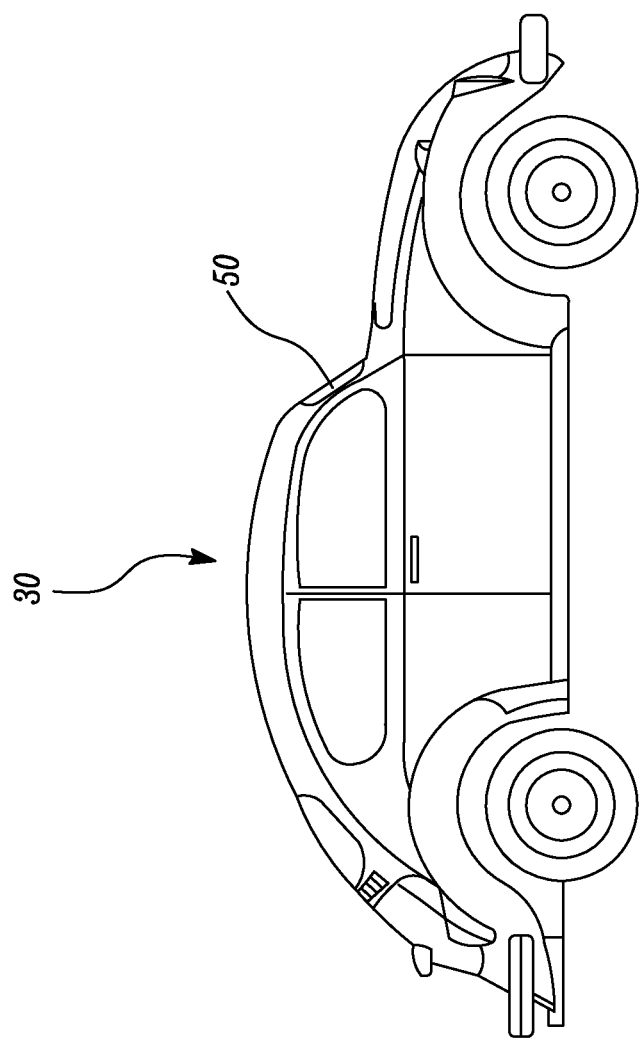
FIG. 1 illustrates a schematic side view of an example of a vehicle having a windshield.

Referring now to the Figures, FIG. 1 schematically shows a side view of an example vehicle 30 that may implement illustrative embodiments of the invention. The vehicle 30 may include any navigable vehicle that may be operated on a road surface, and includes without limitation cars, buses, motorcycles, off-road vehicles, and trucks. The vehicle 30 may in some other embodiments also include water vehicles and aircrafts. The vehicle 30 includes a windshield 50. The windshield 50 may include any of a wide variety of transparent members, and can be unitary or laminated, flat or curved (simple or compound curvature), water clear or tinted, can have focusing properties (e.g., in the case of goggles or other eyewear), and can be composed of any conventional glasses and/or plastics. In some cases, the windshield 50 may include a sheet of glass or other transparent material with two opposing surfaces. In some embodiments, the windshield 50 includes a reflective polarizer embedded therein.

Figure 2:
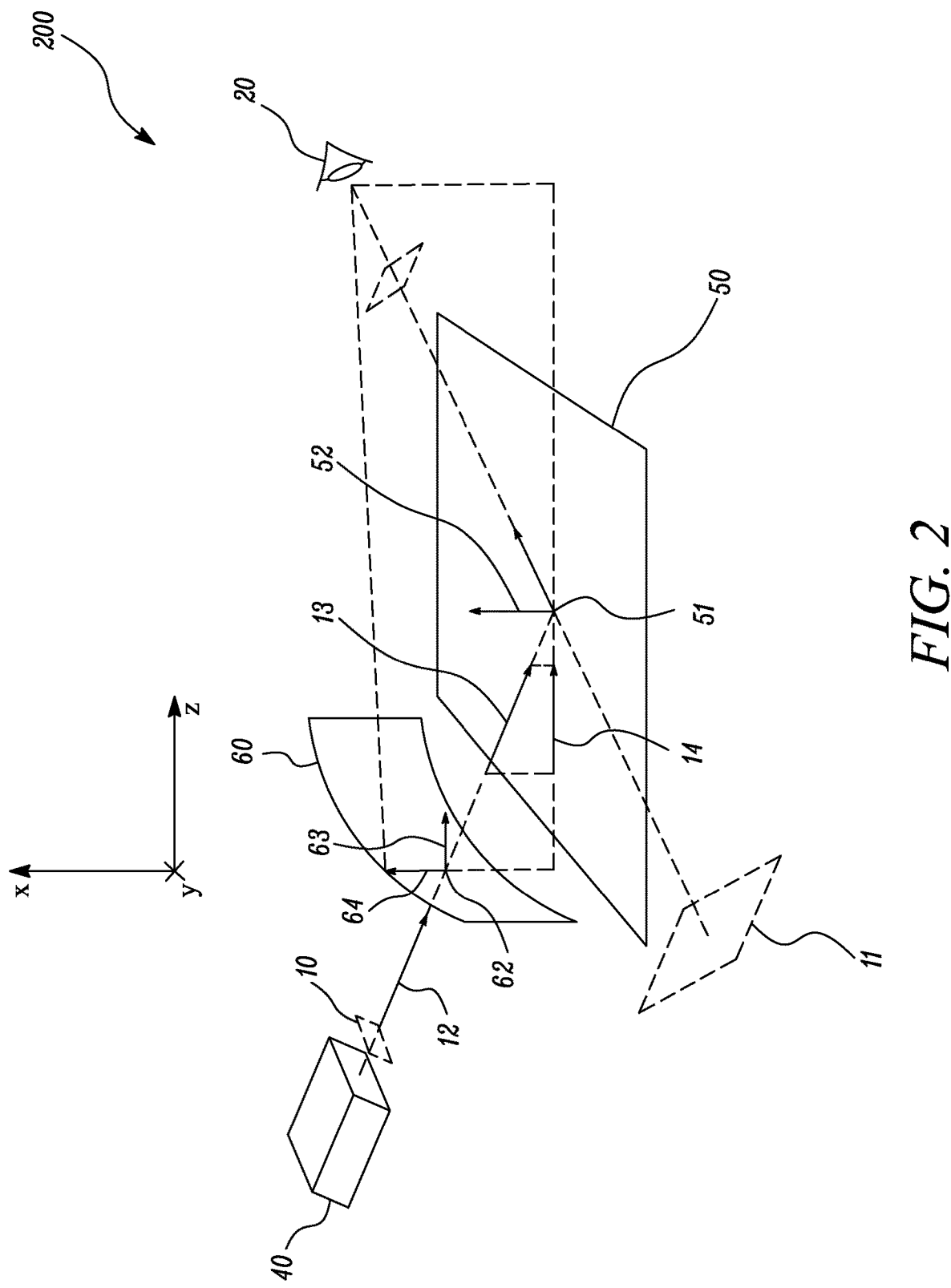
FIG. 2 illustrates a schematic view of a heads up display (HUD) for forming a virtual image for viewing by an occupant of the vehicle according to one embodiment of the present disclosure.

FIG. 2 illustrates a heads up display (HUD) 200 for forming a virtual image 11 of an emitted image 10 for viewing by an occupant 20 of the vehicle 30 (shown in FIG. 1).

The HUD 200 includes a display source 40, the windshield 50 of the vehicle 30, and an absorbing polarizer 60. The HUD 200 displays information to the occupant 20 of the vehicle 30. In some embodiments, the occupant 20 is the driver of the vehicle 30. The HUD 200 displays the information in the driver's view, so that the driver may not need to look away from the windshield 50 while driving to see the information displayed. The HUD 200 of the vehicle 30 as disclosed in the present disclosure may be configured to, and without limitation, display any type of information, such as map related information, navigation instructions, certain type of warning or alerts, automatic driving assistance information, vehicle's speed, fuel level, engine temperature, communication events, and other related information on the windshield 50 of the vehicle 30. The display of such information on the windshield 50 of the vehicle 30 may also be represented as and without limitation in any form, such as digital gauges, text boxes, animated images, or any other graphical representation. Further, the HUD 200 of the vehicle 30 may also present augmented reality graphic elements which augment a physical environment surrounding the vehicle with real-time information.

The display source 40 is configured to emit the emitted image 10. The display source 40 may include various elements, such as a liquid crystal display (LCD), an electroluminescent panel, an incandescent or a phosphorescent light source, a cathode ray tube (CRT), light emitting diodes (LEDs), and lenses, collimators, reflectors, and/or polarizers. The emitted image 10 can be substantially monochromatic, polychromatic, narrow band, or broad band, but preferably overlaps at least a portion of the visible spectrum from about 400 nanometers (nm) to 700 nm. Furthermore, the display source 40 may also include a mechanism, such as a tilting mirror or displacement means, to change the angle and/or position of the emitted image 10 so as to accommodate occupants at different positions or heights.

The absorbing polarizer 60 defines mutually orthogonal x, y and z-axes. The x and y-axes are in-plane axes of the absorbing polarizer 60, while the z-axis is a transverse axis disposed along a thickness of the absorbing polarizer 60. In other words, the x and y-axes are disposed along a plane of the absorbing polarizer 60, while the z-axis is perpendicular to the plane of the absorbing polarizer 60. The absorbing polarizer 60 is disposed between the display source 40 and the windshield 50.

Figure 3:
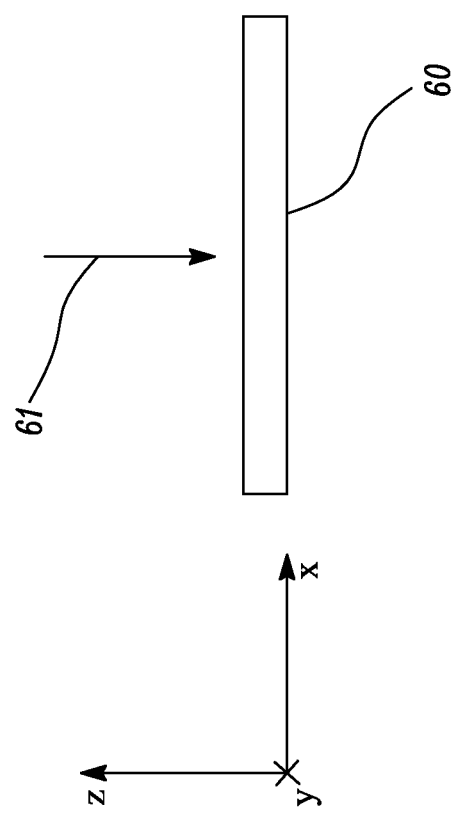
FIG. 3 illustrates a schematic view of an absorbing polarizer according to one embodiment of the present disclosure.

Referring to FIGS. 2 and 3, the absorbing polarizer 60 is disposed between the display source 40 and the windshield 50, such that for substantially normally incident light 61 and for at least one wavelength between about 420 nm and about 670 nm, the absorbing polarizer 60 transmits at least 60% of the incident light 61 polarized along a pass direction 64, and absorbs at least 60% of the incident light 61 polarized along an orthogonal block direction. In some embodiments, for the substantially normally incident light 61 and for the at least one wavelength between about 420 nm and about 670 nm, the absorbing polarizer 60 transmits at least 70% of the incident light 61 polarized along the pass direction 64, and absorbs at least 70% of the incident light 61 polarized along the block direction. In some other embodiments, for the substantially normally incident light 61 and for the at least one wavelength between about 420 nm and about 670 nm, the absorbing polarizer 60 transmits at least 80% of the incident light 61 polarized along the pass direction 64, and absorbs at least 80% of the incident light 61 polarized along the block direction. In some embodiments, the pass direction 64 is defined along the x-axis, while the block direction is defined along the y-axis. In some embodiments, the pass direction 64 has a P polarization state, while the block direction has a S polarization state.

The emitted image 10 includes at least one image ray 12 that is received and transmitted by the absorbing polarizer 60 toward the windshield 50 at a first location 62 of the absorbing polarizer 60. While it is understood that the display source 40 typically emits the emitted image 10 over a finite angular cone, only one image ray 12 of emitted image 10 is depicted for ease of illustration.

The transmitted image ray 13 is received and reflected by the windshield 50 toward the occupant 20 at a second location 51 of the windshield 50. The transmitted image ray 13 emitted towards the windshield 50 has a substantially P polarization state.

The at least one image ray 12 and the transmitted image ray 13 are such that a first normal line 63 of the absorbing polarizer 60 at the first location 62 is substantially parallel to a projection 14 of the transmitted image ray 13 onto the windshield 50, and the pass direction 64 of the absorbing polarizer 60 at the first location 62 is substantially parallel to a second normal line 52 of the windshield 50 at the second location 51.

In other words, the plane of the absorbing polarizer 60 is orthogonal to both the windshield 50 and the projection 14 of the transmitted image ray 13 onto the windshield 50, and the pass direction 64 of the absorbing polarizer 60 is orthogonal to a plane of the windshield 50.

The absorbing polarizer 60 may have a curved shape and a position such that substantially all transmitted image rays of the emitted image 10 from the display source 40 have a single polarization state, i.e., P polarization state. Therefore, light originating from the display source 40 incident on the windshield 50 may be substantially P polarized light.

The windshield 50 may be designed such that substantially all of incident P polarized light is reflected toward the occupant 20. This may reduce or eliminate "ghosting". In other words, providing substantially P polarized light onto the windshield 50 may prevent generation of "ghost images" that are otherwise caused by unwanted reflections at front and back glass-air interfaces of the windshield 50.

Figure 4B:
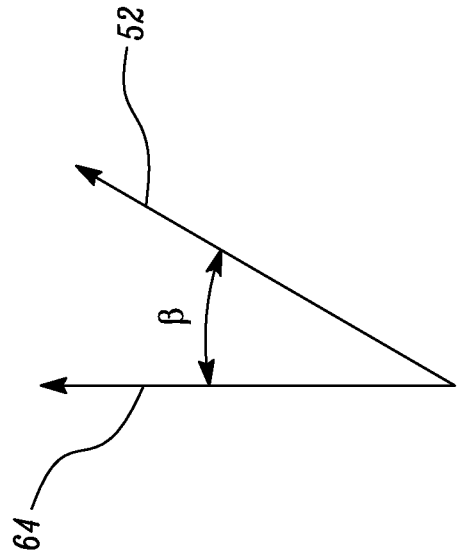
FIG. 4B illustrates an angle between a pass direction of the absorbing polarizer and a second normal line of the windshield according to one embodiment of the present disclosure.
Figure 4A:
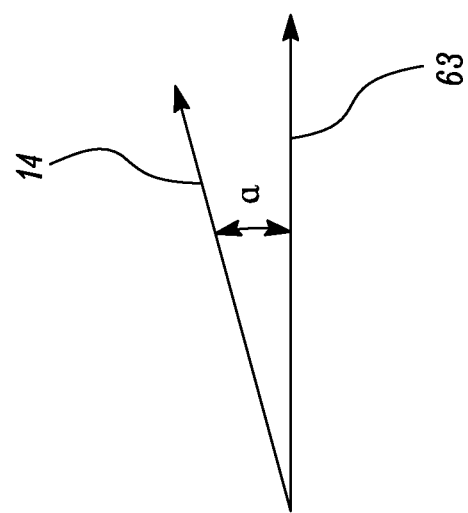
FIG. 4A illustrates an angle between a first normal line of the absorbing polarizer and a projection of a transmitted image ray onto the windshield according to one embodiment of the present disclosure.

FIG. 4A illustrates an exemplary angle α between the first normal line 63 and the projection 14. Specifically, referring to FIGS. 2 and 4A, the angle α is between the first normal line 63 of the absorbing polarizer 60 at the first location 62 and the projection 14 of the transmitted image ray 13 onto the windshield 50. In some embodiments, the angle α is less than about 5 degrees. In some other embodiments, the angle α is less than about 2.5 degrees. In some other embodiments, the angle α is less than about 1 degree.

FIG. 4B illustrates an exemplary angle β between the pass direction 64 and the second normal line 52. Specifically, referring to FIGS. 2 and 4B, the angle β is between the pass direction 64 of the absorbing polarizer 60 at the first location 62 and the second normal line 52 of the windshield 50 at the second location 51. In some embodiments, the angle β is less than about 5 degrees. In some other embodiments, the angle β is less than about 2.5 degrees. In some other embodiments, the angle β is less than about 1 degree.

Figure 5B:
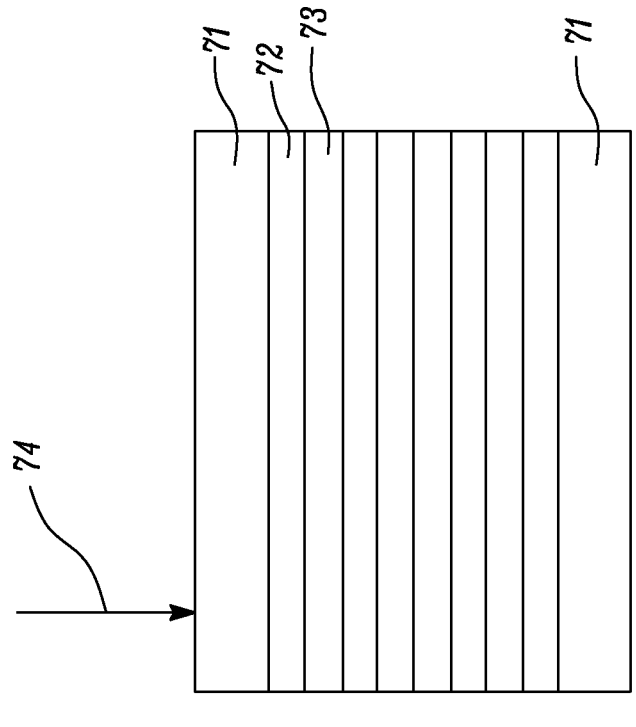
FIG. 5B illustrates a sectional schematic view of the reflective polarizer according to one embodiment of the present disclosure.
Figure 5A:
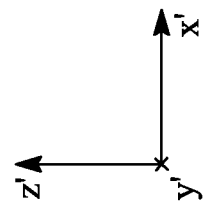
FIG. 5A illustrates a schematic view of the windshield and a reflective polarizer embedded within the windshield according to one embodiment of the present disclosure.
Figure 5A:
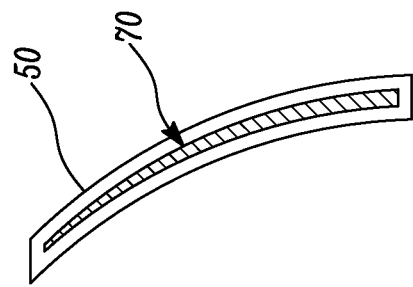

FIG. 5A illustrates a schematic view of the windshield 50. The windshield 50 includes a reflective polarizer 70 embedded therein. In some embodiments, the reflective polarizer 70 may include one or more of a polymeric reflective polarizer, a wire grid reflective polarizer, and a diffuse reflective polarizer. In some embodiments, the reflective polarizer 70 is a linear reflective polarizer. In some other embodiments, the reflective polarizer 70 may be a circular reflective polarizer. In some embodiments, the reflective polarizer 70 may extend over only a small portion of a windshield 50, while in some other embodiments, the reflective polarizer 70 may extend in a continuous strip across the entire windshield 50 or can even be fully coextensive with windshield 50. For the vehicle 30 as shown in FIG. 1, the strip can extend horizontally along a lower, upper, or intermediate portion of the windshield 50.

FIG. 5B illustrates a sectional schematic view of the reflective polarizer 70. The reflective polarizer 70 defines mutually orthogonal x', y' and z'-axes. The x' and y'-axes are in-plane axes of the reflective polarizer 70, while the z'-axis is a transverse axis disposed along a thickness of the reflective polarizer 70. In other words, the x' and y'-axes are disposed along a plane of the reflective polarizer 70, while the z'-axis is perpendicular to the plane of the reflective polarizer 70.

For substantially normally incident light 74 and for at least one wavelength between about 420 nm and about 670 nm, the reflective polarizer 70 reflects between about 20% to about 40% of the incident light 74 having a first polarization state, and transmits at least 60% of the incident light 74 having an orthogonal second polarization state. In some embodiments, the first polarization state is defined along the x'-axis, while the second polarization state is defined along the y'-axis. In some embodiments, the first polarization state is a P polarization state, while the second polarization state is a S polarization state.

The reflective polarizer 70 includes a plurality of layers. The plurality of layers of the reflective polarizer 70 includes a plurality of alternating first and second layers 72, 73. In some embodiments, each of the first and second layers 72, 73 has an average thickness of less than about 500 nm. In some other embodiments, each of the first and second layers 72, 73 has an average thickness of less than about 600 nm. In some embodiments, a difference between indices of refraction of the first and second layers 72, 73 along the first polarization state is greater than about 0.05. In some embodiments, the difference between the indices of refraction of the first and second layers 72, 73 along the first polarization state is greater than about 0.051, greater than about 0.052, or greater than about 0.053. The reflective polarizer 70 further includes a protective layer 71 disposed on each major side of the plurality of alternating first and second layers 72, 73.

In some embodiments, the plurality of layers 71, 72, 73 in the reflective polarizer 70 number greater than about 30 in total. In some other embodiments, the plurality of layers 71, 72, 73 in the reflective polarizer 70 number greater than about 50 in total. In some other embodiments, the plurality of layers 71, 72, 73 in the reflective polarizer 70 number greater than about 100 in total. In some other embodiments, the plurality of layers 71, 72, 73 in the reflective polarizer 70 number greater than about 150 in total.

For purposes of the present application, unless otherwise indicated, reflectivities and transmissivities referred to in connection with the reflective polarizer 70 do not take into account any Fresnel reflection that may occur at the outermost surfaces of the reflective polarizer 70. Thus, measurements on a sample of the reflective polarizer 70 in air may typically yield higher reflectivities and lower transmissivities as a result of such Fresnel reflections, unless, for example, the reflective polarizer 70 may be provided with anti-reflection coatings on its outer surfaces.

The polarization-specific reflection properties for the reflective polarizer 70 may be made wavelength specific by appropriate layer thickness selection, so that the reflective polarizer 70 is substantially transparent for all but the selected wavelength(s), where it becomes reflective for light in the first polarization state. The selected wavelength(s) can be a single narrow band, multiple narrow bands, or a broad band. Any suitable degree of reflectivity for the chosen band of wavelengths may be achieved by controlling layer-to-layer refractive index differences and the total number of layers in the reflective polarizer 70. The reflective polarizer 70 may be fabricated from tens or hundreds of co-extruded polymer layers that are substantially non-absorbing in the visible and near infrared wavelengths, such that the sum of reflectivity and transmissivity for the reflective polarizer 70 is about 100%. Therefore, the reflective polarizer 70 reflects the first polarization state and further enhances the effectiveness of the HUD 200.

Appropriate control of the refractive index difference along z'-axis perpendicular to the plane of the reflective polarizer 70 for the plurality of adjacent layers 71, 72, 73 may eliminate the Brewster angle for the reflective polarizer 70, thereby providing highly efficient reflection of light in the first polarization state. Such reflection can also be effective over a wide angular range to permit the reflective polarizer 70 to be useful in the HUD 200, for example, for a greater design flexibility.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A heads up display (HUD) for forming a virtual image of an emitted image for viewing by an occupant of a vehicle, the HUD comprising:
a display source configured to emit the emitted image;
a windshield of the vehicle; and
an absorbing polarizer disposed between the display source and the windshield, such that for substantially normally incident light and for at least one wavelength between about 420 nm and about 670 nm, the absorbing polarizer transmits at least 60% of the incident light polarized along a pass direction, and absorbs at least 60% of the incident light polarized along an orthogonal block direction, the emitted image comprising at least one image ray that is received and transmitted by the absorbing polarizer toward the windshield at a first location of the absorbing polarizer, and the transmitted image ray is received and reflected by the windshield toward the occupant at a second location of the windshield, such that:
a first normal line of the absorbing polarizer at the first location is substantially parallel to a projection of the transmitted image ray onto the windshield; and
the pass direction of the absorbing polarizer at the first location is substantially parallel to a second normal line of the windshield at the second location.

2. The HUD of claim 1, wherein for the substantially normally incident light and for the at least one wavelength between about 420 nm and about 670 nm, the absorbing polarizer transmits at least 70% of the incident light polarized along the pass direction, and absorbs at least 70% of the incident light polarized along the block direction.

3. The HUD of claim 1, wherein for the substantially normally incident light and for the at least one wavelength between about 420 nm and about 670 nm, the absorbing polarizer transmits at least 80% of the incident light polarized along the pass direction, and absorbs at least 80% of the incident light polarized along the block direction.

4. The HUD of claim 1, wherein an angle between the first normal line of the absorbing polarizer at the first location and the projection of the transmitted image ray onto the windshield is less than about 5 degrees.

5. The HUD of claim 1, wherein an angle between the first normal line of the absorbing polarizer at the first location and the projection of the transmitted image ray onto the windshield is less than about 2.5 degrees.

6. The HUD of claim 1, wherein an angle between the pass direction of the absorbing polarizer at the first location and the second normal line of the windshield at the second location is less than about 5 degrees.

7. The HUD of claim 1, wherein an angle between the pass direction of the absorbing polarizer at the first location and the second normal line of the windshield at the second location is less than about 2.5 degrees.

8. The HUD of claim 1, wherein the windshield comprises a reflective polarizer embedded therein.

9. The HUD of claim 8, wherein for substantially normally incident light and for at least one wavelength between about 420 nm and about 670 nm, the reflective polarizer reflects between about 20% to about 40% of the incident light having a first polarization state, and transmits at least 60% of the incident light having an orthogonal second polarization state.

10. The HUD of claim 9, wherein the reflective polarizer comprises a plurality of layers numbering greater than about 100 in total, and wherein the plurality of layers of the reflective polarizer comprises a plurality of alternating first and second layers, each of the first and second layers having an average thickness of less than about 500 nm, a difference between indices of refraction of the first and second layers along the first polarization state being greater than about 0.05.

* * * * *